United States Patent
Rajendiran (10) Patent No.: US 12,039,192 B2
(45) Date of Patent: Jul. 16, 2024

(54) EFFICIENT BUFFER MANAGEMENT FOR MEDIA MANAGEMENT COMMANDS IN MEMORY DEVICES

(71) Applicant: Micron Technology, Inc., Boise, ID (US)

(72) Inventor: Bharani Rajendiran, Pleasanton, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/446,191

(22) Filed: Aug. 27, 2021

(65) Prior Publication Data

US 2023/0066344 A1    Mar. 2, 2023

(51) Int. Cl.
G06F 3/06    (2006.01)

(52) U.S. Cl.
CPC .......... *G06F 3/0656* (2013.01); *G06F 3/0604* (2013.01); *G06F 3/0653* (2013.01); *G06F 3/0659* (2013.01); *G06F 3/0679* (2013.01)

(58) Field of Classification Search
CPC .... G06F 3/0604; G06F 3/0653; G06F 3/0656; G06F 3/0659; G06F 3/0679; G06F 3/0619
See application file for complete search history.

(56) References Cited

U.S. PATENT DOCUMENTS

| 2009/0172260 | A1* | 7/2009 | Olbrich | G11C 16/10 |
| | | | | 711/E12.008 |
| 2012/0084484 | A1* | 4/2012 | Post | G06F 12/0246 |
| | | | | 710/308 |
| 2017/0075625 | A1* | 3/2017 | Nazari | G06F 3/0647 |
| 2021/0064274 | A1* | 3/2021 | Lee | G06F 3/0653 |
| 2021/0303199 | A1* | 9/2021 | Horspool | G06F 3/0659 |

* cited by examiner

*Primary Examiner* — Larry T MacKall
(74) *Attorney, Agent, or Firm* — LOWENSTEIN SANDLER LLP (57) ABSTRACT

A buffer management component of a memory sub-system configures a plurality of read buffers in a data path associated with a memory device; receives a first read command to read data stored at the memory device; selects a first read buffer to receive the first data; responsive to selecting the first buffer, initiates a read operation to retrieve the first data from the memory device and store the first data in the first read buffer; receives a second read command to read a second data stored at the memory device, where second read command is received before first read command has been completed; determines whether a second read buffer is available to receive the second data; responsive to determining that the second read buffer is available, selects the second read buffer to receive the second data for the second read command; and responsive to selecting the second read buffer, initiates a second read operation to retrieve the second data from the memory device and store the first data in the second read buffer.

18 Claims, 6 Drawing Sheets

EFFICIENT BUFFER MANAGEMENT FOR MEDIA MANAGEMENT COMMANDS IN MEMORY DEVICES

TECHNICAL FIELD

Embodiments of the disclosure relate generally to memory sub-systems, and more specifically, relate to efficient buffer management for media management commands in memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to efficient buffer management for media management commands in memory devices. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored.

A memory sub-system controller can perform access operations on a memory device such as read operations, programming operations, erase operations, or the like. The memory sub-system controller can include a standard processing path (or "front end path") which facilitates processing these access operations in response to requests received from a host system or "front end". The memory sub-system controller can also include an additional processing path for the firmware component (or "firmware path") that facilitates media management operations to manage the performance and reliability of associated memory devices. For example, the firmware path can manage read and write operations associated with garbage collection as well as error detection and correction to facilitate uniform distribution of data and, in turn, reduce wear on the media devices.

In conventional memory sub-systems, operations in the front end path can access memory devices when operations in the firmware path can be initiated. Thus, the firmware path operations should be as efficient as possible in order to avoid disruption of operations in the front end path. Conventional systems often implement single threaded processing for operations in the firmware path to reduce any conflicts that can arise with operations in the front end path. These types of implementations can couple a buffer to a local memory area within the media controller to facilitate efficient data transfer while performing the media management operations for the firmware path. In such instances the buffer can be coupled to the local memory area using a bus interface such as an Advanced Extensible Interface (AXI) to improve performance of the media management operation and reduce processing time. The conventional single threading of firmware operations, however, can often lead to underutilization of a high speed AXI bus.

Conventional memory sub-systems attempt to mitigate these issues by scheduling media management commands during periods when the front end path is experiencing lower activity. These types of solutions, while able to decrease conflicts with front end path operations can still lead to underutilized bus interfaces since the amount of data transferred can still be limited by the single threading of operations.

Aspects of the present disclosure address the above and other deficiencies by configuring multiple buffers for processing read and write commands associated with firmware media management operations. In one embodiment, a buffer management component of the memory sub-system controller can configure a group of read buffers for firmware read commands. The buffer management component can receive read commands and assign the received commands to available buffers so that multiple read commands can be processed concurrently. Similarly, the buffer management component of the memory sub-system controller can configure a group of write buffers for firmware write commands. The buffer management component can receive write commands and assign the received commands to available buffers so that multiple write commands can be processed concurrently.

Advantages of the present disclosure include, but are not limited to, significantly increased throughput for firmware media management commands. By increasing the number of buffers in the memory sub-system controller, the number of concurrently processed commands can be increased, which can decrease the time needed to perform corresponding operations. Additionally, the utilization of available buffer bandwidth can be significantly increased for media management commands in the firmware path. By increasing the number of commands that can be processed simultaneously, the utilization of bus interface connections can be increased, since more data firmware media management commands can be performed over a period of time.

Figure 1:
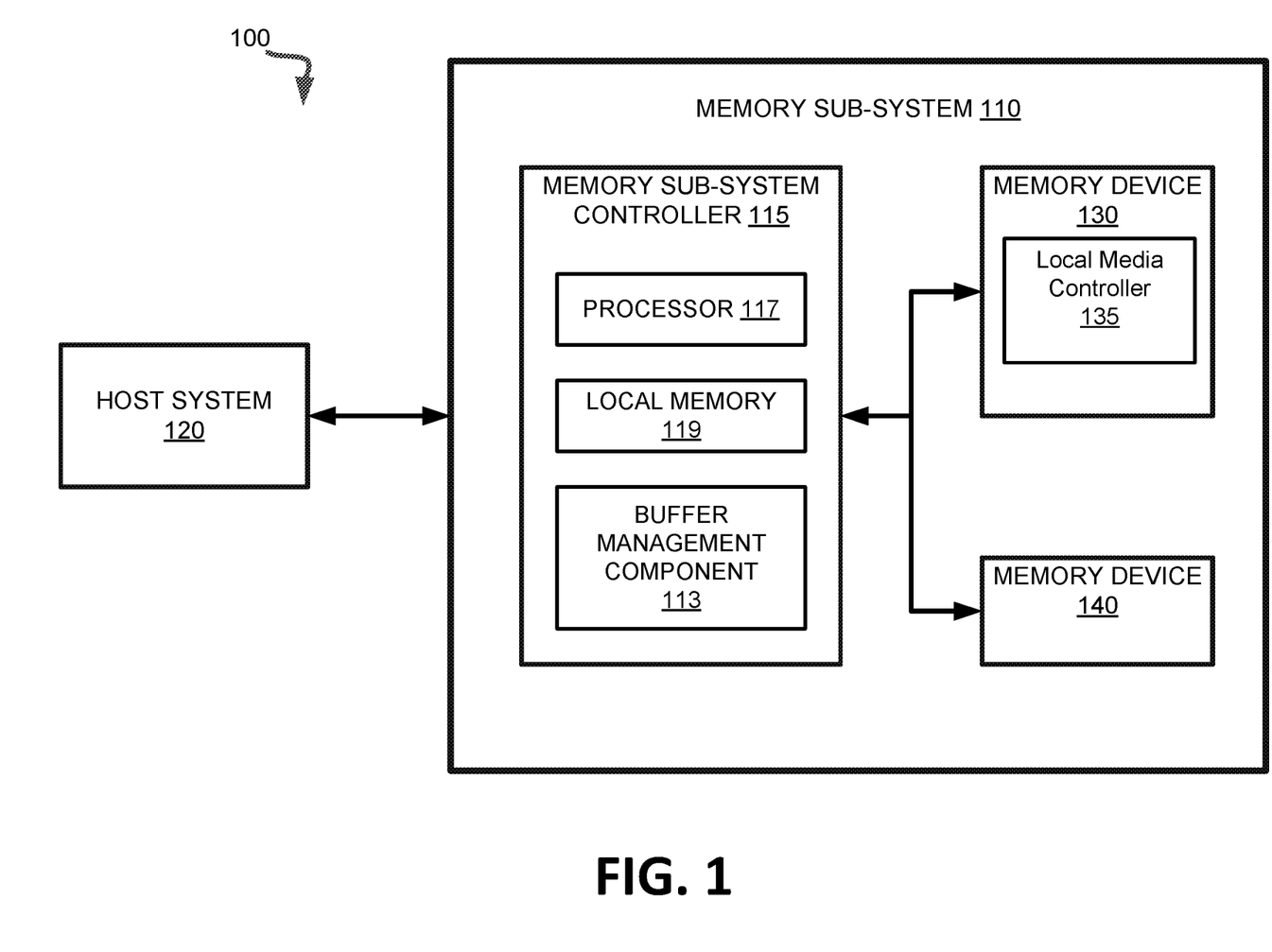
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 can include a buffer management component 113 that can be used to facilitate efficient firmware media management operations to read and/or write data to/from memory devices 130, 140. In some embodiments, the memory sub-system controller 115 includes at least a portion of the buffer management component 113. In some embodiments, the buffer management component 113 is part of the host system 110, an application, or an operating system. In other embodiments, local media controller 135 includes at least a portion of buffer management component 113 and is configured to perform the functionality described herein.

In various implementations, buffer management component 113 can configure a group of read buffers for the memory sub-system controller 115. An various implementations, the group of read buffers can configured in a memory area accessible to memory sub-system controller 115 and coupled to the local memory 119 via a bus interface to facilitate efficient data transfer. For example, in some implementations, the buffers can be coupled to the local memory 119 via an Advanced Extensible Interface (AXI) bus. The buffer management component 113 can receive a first read command to read data stored at memory devices 130, 140 and select one of the configured buffers to receive the data for the first read command. Responsive to selecting the buffer, the buffer management component 113 can initiate a read operation to retrieve data from memory devices 130, 140 into the selected buffer. The buffer management component 113 can receive a second read command and follow a similar process to select another buffer to process that read command at approximately the same time as the first read command. The buffer management component 113 can facilitate simultaneous processing of as many read commands as there are available read buffers. In various implementations, additional buffers can be configured and left disabled until periods of high volume, when the additional buffers can be enabled to process additional read commands and later disabled when volume normalizes.

Similarly, buffer management component 113 can configure a group of write buffers for the memory sub-system controller 115. As with the read buffers, the group of read buffers can configured in a memory area accessible to memory sub-system controller 115 and coupled to the local memory 119 via a bus interface (e.g., and AXI bus) to facilitate efficient data transfer. The buffer management component 113 can receive a first write command to write data to memory devices 130, 140 and select one of the configured buffers to receive the data for the first write command. Responsive to selecting the buffer, the buffer management component 113 can retrieve data from a local memory space and initiate a write operation to store the data to memory devices 130, 140 using the selected buffer. The buffer management component 113 can receive a second write command and follow a similar process to select another buffer to process that write command at approximately the same time as the first write command. The buffer management component 113 can facilitate simultaneous processing of as many write commands as there are available write buffers. In various implementations, additional buffers can be configured and left disabled until periods of high volume, when the additional buffers can be enabled to process additional write commands and later disabled when volume normalizes.

Further details with regards to the operations of the buffer management component 113 are described below with respect to FIGS. 2-5.

Figure 2:
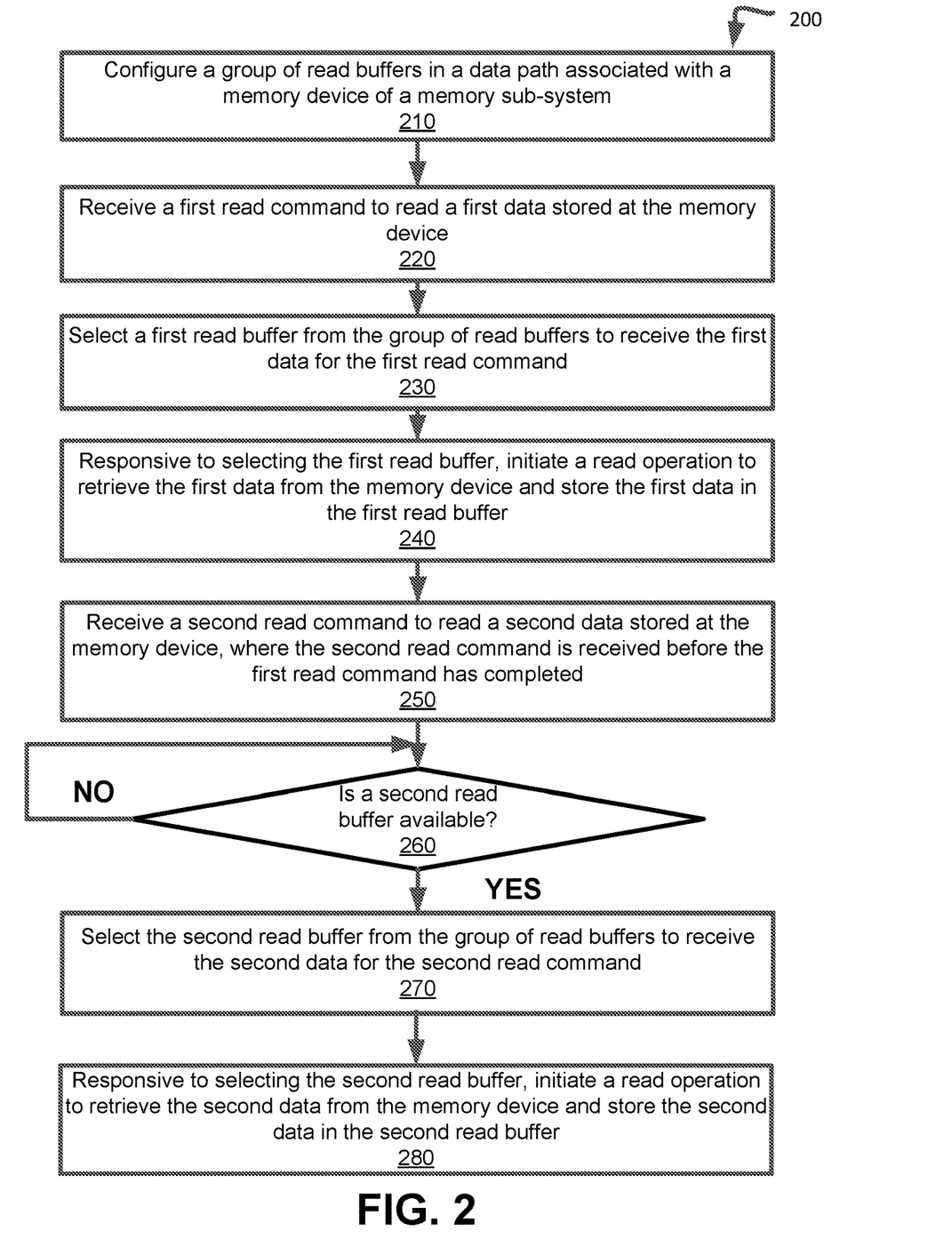
FIG. 2 is a flow diagram of an example method to facilitate efficient buffer management to service media management read command for memory devices, in accordance with some embodiments of the present disclosure.

FIG. 2 is a flow diagram of an example method 200 to facilitate efficient buffer management to service media management read command for memory devices, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the buffer management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing logic configures a group of read buffers in a data path associated with a memory device of a memory sub-system (e.g., memory devices 130-140 in FIG. 1). In various implementations, the group of read buffers can be configured in the data path to facilitate retrieving data from the memory device (or devices) in the memory sub-system so that the data can be provided to a local memory space for the memory sub-system (e.g., local memory 119 of FIG. 1). The group of read buffers can be coupled to the local memory space (e.g., an external memory space) via a bus interface to facilitate efficient data transfer. For example, in some implementations, the buffers can be coupled to the local memory space via an Advanced Extensible Interface (AXI) bus.

In some implementations, the processing logic can configure the group of read buffers such that received commands to read data from the memory device(s) can alternate between all of the configured buffers. In other implementations, the processing logic can configure the group of read buffers such that a subset of the buffers are enabled initially for read commands. As described in further detail below, the processing logic can monitor system activity and if the amount of read command activity satisfies a threshold (e.g., the system observes a high level of read activity), the processing logic can enable one or more additional read buffers in the group of read buffers temporarily to handle the increased activity. Once the period of high activity ends (e.g., the observed level of read activity satisfies a lower threshold), the processing logic can disable any additional buffers for newly received read commands.

At operation 220, the processing logic can receive a read command to read data stored at one or more of the memory devices of the memory sub-system. In various implementations, the request can be received from a firmware component of the memory sub-system controller associated with the memory device (e.g., a component of memory sub-system controller 115 in FIG. 1). As noted above, the firmware component can perform various media management operations to manage the performance and reliability of the memory device(s) for the memory sub-system. For example, the firmware component can perform garbage collection operations, data redistribution operations, or the like, to facilitate uniform data distribution across each memory device. In some implementations, the processing logic can receive the command directly from the firmware component. In some implementations, the processing logic can receive the command by accessing a queue of stored commands (e.g., a first-in-first-out (FIFO) queue) that can be maintained by the firmware component. In various implementations, the received command can include information that identifies the address of the data to be read from the memory device(s).

At operation 230, the processing logic selects a read buffer from the group of read buffers to receive the data for the first read command. The processing logic can select a buffer by first identifying the configured read buffers and subsequently determining whether any of them are available to receive the read data. In some implementations, each configured read buffer can include attributes that indicate whether or not that buffer is available to be used to process a read command (e.g., not currently being used for another command, not disabled or otherwise unavailable for use, etc. at the time the command is received). For example, a memory space or register value can be used to store flags, binary data, or other indicators to indicate whether the buffer is available. In such instances, the processing logic can analyze this information to select a buffer. Alternatively, the buffer can be configured in the memory sub-system to generate a voltage pulse, notification, or the like to indicate to the processing logic whether the buffer is available. In some implementations, the processing logic can check each configured buffer sequentially, (e.g., buffer 0, then buffer 1, then buffer 2, etc.) and select the first buffer that is available. Alternatively, the processing logic can check the status of all enabled buffers and select one of the available buffers randomly (or pseudo-randomly).

At operation 240, the processing logic, responsive to selecting a buffer for the read command received at operation 220, initiates a read operation to retrieve the data for that read command and store the data in the read buffer selected at operation 230. In some implementations, the processing logic can initiate the read operation by first storing command information associated with the received command. This information can include an identifier or indicator that associates the command with the selected read buffer to receive the read data for that command. For example, if read buffer '0' is selected at operation 230, the command information can be stored such that read buffer '0' is identified as associated with that command. Additionally, the command information can include a unique identifier associated with the command itself so that the processing logic can match the command and buffer with each other using the stored command information.

Once the command information has been stored, processing logic can retrieve the requested data from the memory device(s). As noted above, the memory address of the data to be read from the memory device(s) can be included with the received request. Processing logic can use this information (or other information included in the received request) to determine the applicable memory device(s) as well as the applicable storage location(s) from which to retrieve the data. In some implementations, the data may be stored across multiple devices or multiple locations within a single device. The processing logic can retrieve the data and aggregate it in a read data path block or other available cache memory space within the memory sub-system. The processing logic can then perform a data integrity check against the aggregated data to determine if the data is valid (e.g., the processing logic can perform one or more correction check operations on the data to establish validity/authenticity). In some implementations processing logic can perform the aggregation and integrity check operations by sending a notification to a media management component of the memory sub-system that directly interfaces with the read data block and the memory devices.

Responsive to performing the data integrity operation, processing logic can store the requested data in the selected read data buffer. As noted above, in some instances, processing logic can use the stored command information to identify the selected read buffer that is to be used to store the read data for that command. Once the data has been stored in the read buffer, processing logic can perform a direct memory access (DMA) write operation to move the requested data from the read buffer to the local memory location. Once the DMA write operation has completed, processing logic can update a command status for the first read command to indicate that the first read command has completed. In some implementations, this command status can be included in the stored command information associated with the first read command. In various implementations, this can indicate that the memory space or register used for the completed command can be reused for another read command. Additionally, processing logic can update a buffer status for the associated read buffer to indicate that the read buffer is available to receive additional data to service other received commands.

As noted above, by configuring multiple read buffers (e.g., multiple buffers to facilitate processing firmware read commands), multiple firmware media management read commands can be in flight (e.g., in process, active, etc.) at approximately the same time to improve local memory interface bandwidth utilization. At operation 250, the processing logic receives a second read command to read data stored at the memory device(s), where this second read command is received before the first read command received at operation 220 has been completed. In various implementations, the firmware component can send a notification to the processing logic to indicate that another command is available to be processed. Alternatively, the processing logic can be monitoring the above mentioned FIFO queue to pop the next read command from the queue. In various implementations, processing logic can simultaneously process a number of read commands according to the number of enabled read buffers. For example, if two read buffers are configured and enabled, the processing logic can alternate between the two buffers, processing two read commands simultaneously. Similarly, if three read buffers are configured and enabled, the processing logic can process three read commands simultaneously, and so on.

At operation 260, the processing logic determines whether a second read buffer is available (e.g., not currently being used to process another read command) to receive data for the second read command received at operation 250. In various implementations, processing logic can make this determination by examining the buffer status for each of the enabled read buffers. For example, the processing logic can interrogate a memory space or register space that includes the status of each buffer. Alternatively, processing logic can receive a notification, voltage pulse, or other indication that indicates which buffers are enabled and which buffers are disabled.

At operation 270, the processing logic, responsive to determining that another buffer is available, can select another buffer to receive the data for the additional read command. Processing logic can select this additional buffer as described above with respect to operation 230. At operation 280, the processing logic, responsive to selecting the additional buffer for the second read command, can initiate a second read operation to retrieve the data for the second read command from the memory device and store the data in the buffer selected at operation 270. Processing logic can initiate the second read operation as described above with respect to operation 240. In various implementations, processing logic can repeat the above described operations to process any subsequently received read commands to retrieve additional data from the memory device(s) of the memory sub-system.

In some implementations, the buffers in the memory sub-system can be configured to handle both read and write commands. For example, during periods of increased read command activity, processing logic can temporarily provision buffers that are configured to service write commands. If, at operation 260, processing logic determines that no additional read buffers are available, processing logic can identify the write buffers in a write data path associated with the memory device. The processing logic can determine whether any of the identified write buffers are available (e.g., not being utilized to service an executing write command), and if so temporarily provision the available write buffer to receive the data to service the pending read command. Upon completion of the read command, if write commands have been newly received, the provisioned write buffer can be returned to the pool of buffers to service write commands. If, however, no additional write commands have been received, the provisioned write buffer can be used for additional read commands.

As noted above, in some implementations, processing logic can configure multiple read buffers and enable a subset of those buffers for read traffic to maintain lower power consumption. During periods of increased observed read activity, processing logic can temporarily enable additional read buffers during those periods of increased activity. Subsequently, when the activity level decreases, the additional read buffers can be disabled to return power consumption to lower levels. In such instances, at operation 210, processing logic can determine a total number of read buffers that were configured for read commands, and enable a number of read buffers that is less than the total number. Subsequently, processing logic can monitor the level of read activity associated with received read commands. For example, the processing logic can monitor the number of read commands received over a period time, the amount of data processed for read commands over a period of time, or the like. Processing logic can determine whether the observed read activity satisfies a high activity threshold, and if so, enabling one or more of the configured (but not enabled) buffers to service additional read commands. Processing logic can continue monitoring the read activity, maintaining the additional buffers until the read activity drops to a lower activity threshold. Responsive to determining that the activity has satisfied the lower threshold, processing logic can disable the additional read buffer(s).

Figure 3:
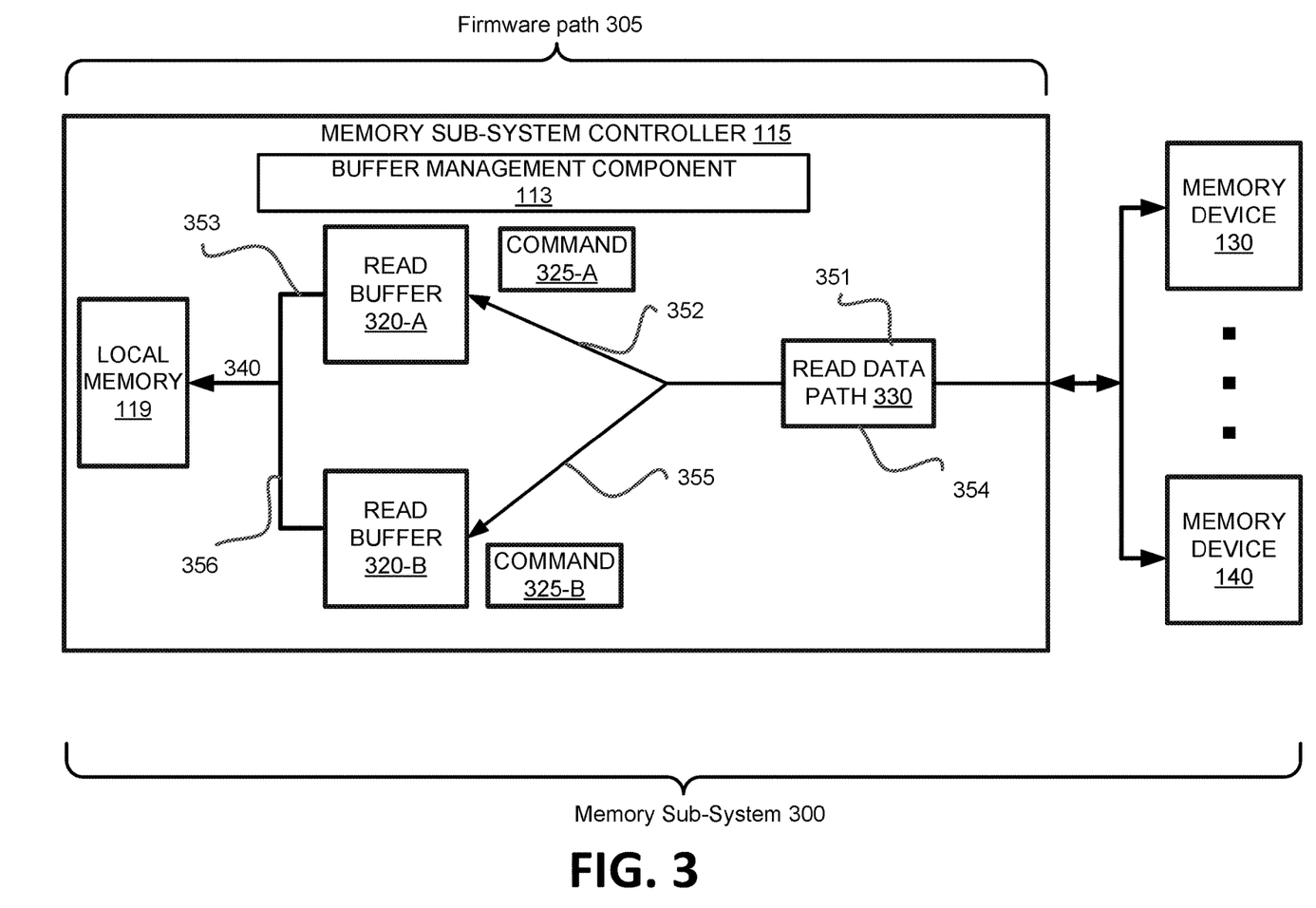
FIG. 3 illustrates a block diagram of a memory sub-system that includes a buffer management component to facilitate efficient buffer management for firmware media management read commands in a firmware path, in accordance with some embodiments of the present disclosure.

FIG. 3 illustrates a block diagram of a memory sub-system 300 that includes a buffer management component 113 (e.g., buffer management component 113 of memory sub-system 110 in FIG. 1) to facilitate efficient buffer management for firmware media management read commands in a firmware path 305, in accordance with some embodiments of the present disclosure.

As shown in FIG. 3, and as described above with respect to FIG. 2, buffer management component 113 can configure read buffers 320-A, 320-B for use in the firmware path 305 in performing media management read operations. Although for simplicity of illustration only two buffers are shown in FIG. 3, in various implementations, aspects of the present disclosure can be applied to memory sub-systems that can configure more than two buffers. As described above, buffers 320-A, 320-B can be coupled to local memory 119 via a bus 340 (e.g., an AXI bus) to facilitate efficient data transfer.

Buffer management component 113 can receive a read command (directly from a firmware component, from a command queue, etc.), and store information associated with that command in a memory space command 325-A. As shown, buffer management component 113 identifies read buffer 320-A as available and selects it for command 325-A. Once read buffer 320-A has been selected, buffer management component 113 initiates a read operation to read the target data from memory devices 130, 140. As described above, buffer management component 113 can initiate operation 351 that retrieves the target data from memory devices 130, 140 into read data path 330. Read data path 330 can perform aggregation and data integrity operations to ensure data validity. Once the read data path 330 confirms data validity, the data loaded into read buffer 320-A. In various implementations, when read operation is performed to retrieve the data from memory devices 130, 140, the read command includes a reference to the stored command information 325-A. When the read data path 330 prepares the data to be loaded into a buffer, it can refer to the command information 325-A to determine which read buffer is to receive the data. At operation 352, read data path 330 determines that command 325-A is associated with read buffer 320-A and loads the data into that read buffer. Once the data has been loaded, buffer management component 113 can initiate a DMA write 353 to write the data from read buffer 320-A to local memory 119 for the associated firmware media management operation.

Similarly, buffer management component 113 can receive an additional read command to read data from memory devices 130, 140 and store information associated with that command in a memory space command 325-B. In some instances read command 325-B can be received immediately following read command 325-A. In other instances, read command 325-B can be received at a later time, but before read command 325-A has been completed. As shown, buffer management component 113 identifies read buffer 320-B as available and selects it for command 325-B. Once read buffer 320-B has been selected, buffer management component 113 initiates a read operation to read the target data from memory devices 130, 140. As described above, buffer management component 113 can initiate operation 354 that retrieves the target data from memory devices 130, 140 into read data path 330. Read data path 330 can perform aggregation and data integrity operations to ensure data validity. Once the read data path 330 confirms data validity, the data loaded into read buffer 320-B. In various implementations, when read operation is performed to retrieve the data from memory devices 130, 140, the read command includes a reference to the stored command information 325-B. When the read data path 330 prepares the data to be loaded into a buffer, it can refer to the command information 325-B to determine which read buffer is to receive the data. At operation 355, read data path 330 determines that command 325-B is associated with read buffer 320-B and loads the data into that read buffer. Once the data has been loaded, buffer management component 113 can initiate a DMA write 356 to write the data from read buffer 320-B to local memory 119 for the associated firmware media management operation.

The above process can be repeated for any additional read commands that are received and processed by buffer management component 113. As shown in FIG. 3, buffer management component 113 can assign new commands to one of the two buffers 320-A, 320-B based on the availability of either of the two buffers. In implementations with additional buffers, buffer management component 113 can select an available buffer from the applicable group of available buffers.

Figure 4:
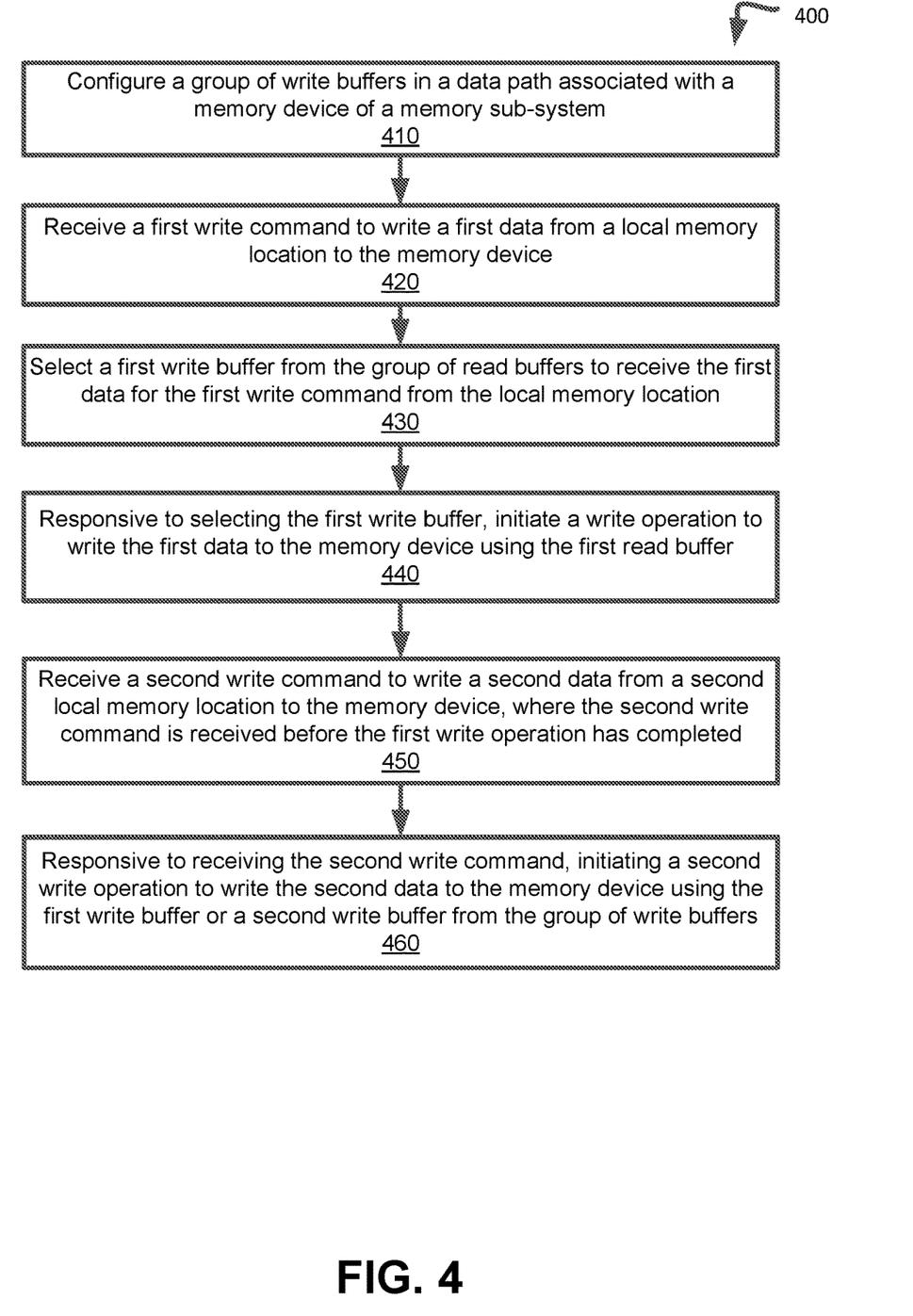
FIG. 4 is a flow diagram of an example method to facilitate efficient buffer management to service media management write command for memory devices, in accordance with some embodiments of the present disclosure.

FIG. 4 is a flow diagram of an example method 400 to facilitate efficient buffer management to service media management write command for memory devices, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the buffer management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic configures a group of write buffers in a data path associated with a memory device of a memory sub-system (e.g., memory devices 130-140 in FIG. 1). In various implementations, the group of write buffers can be configured in the data path to facilitate writing data to the memory device (or devices) from a local memory space (e.g., local memory 119 of FIG. 1). The group of write buffers can be coupled to the local memory space (e.g., an external memory space) via a bus interface to facilitate efficient data transfer. For example, in some implementations, the write buffers can be coupled to the local memory space via an Advanced Extensible Interface (AXI) bus.

In some implementations, the processing logic can configure the group of write buffers such that received commands to write data from the local memory space to the memory device(s) can alternate between all of the configured buffers. In other implementations, the processing logic can configure the group of write buffers such that a subset of the buffers are enabled initially for write commands. As described in further detail below, the processing logic can monitor system activity and if the amount of write command activity satisfies a threshold (e.g., the system observes a high level of write activity), the processing logic can enable one or more additional write buffers in the group of read buffers temporarily to handle the increased activity. Once the period of high activity ends (e.g., the observed level of write activity satisfies a lower threshold), the processing logic can disable any additional buffers for newly received write commands.

At operation 420, the processing logic receives a write command to write data from a local memory location to the memory device. In various implementations, the request can be received from a firmware component of the memory sub-system controller associated with the memory device (e.g., a component of memory sub-system controller 115 in FIG. 1). As noted above, the firmware component can perform various media management operations to manage the performance and reliability of the memory device(s) for the memory sub-system. For example, the firmware component can perform garbage collection operations, data redistribution operations, or the like, to facilitate uniform data distribution across each memory device. In some implementations, the processing logic can receive the command directly from the firmware component. In some implementations, the processing logic can receive the command by accessing a queue of stored requests (e.g., a first-in-first-out (FIFO) queue) that can be maintained by the firmware component. In various implementations, the received command can include information that identifies the address/location associated with the data to be written to the memory device(s).

At operation 430, the processing logic selects a write buffer from the group of write buffers to receive the data for the first write command. The processing logic can select a buffer by first identifying the configured write buffers and subsequently determining whether any of them are available to receive the write data from the local memory space. In some implementations, each configured write buffer can include attributes that indicate whether or not that buffer is available to be used to process a write command (e.g., not currently being used for another command, not disabled or otherwise unavailable for use, etc. at the time the command is received). For example, a memory space or register value can be used to store flags, binary data, or other indicators to indicate whether the buffer is available. In such instances, the processing logic can analyze this information to select a buffer. Alternatively, the buffer can be configured in the memory sub-system to generate a voltage pulse, notification, or the like to indicate to the processing logic whether the buffer is available. In some implementations, the processing logic can check each configured buffer sequentially, (e.g., buffer 0, then buffer 1, then buffer 2, etc.) and select the first buffer that is available. Alternatively, the processing logic can check the status of all enabled buffers and select one of the available buffers randomly (or pseudo-randomly).

At operation 440, the processing logic, responsive to selecting a buffer for the write command received at operation 420, initiates a write operation to write the data for that write command from the local memory space to the memory device using the write buffer selected at operation 430. In some implementations, the processing logic can initiate the write operation by first storing command information associated with the received write command. This information can include an identifier or indicator that associates the command with the selected write buffer to receive the data from the local memory space for that write command. For example, if write buffer '0' is selected at operation 430, the command information can be stored such that write buffer '0' is identified as associated with that command. Additionally, the command information can include a unique identifier associated with the command itself so that the processing logic can match the command and buffer with each other using the stored command information.

Once the command information has been stored, processing logic can perform a direct memory access (DMA) read operation to move the first data from the local memory location to the write buffer selected at operation 430. Responsive to moving the data into the selected write buffer (e.g., responsive to the completion of the DMA read operation), processing logic can perform, in view of the stored command information, the write operation to write the data to the memory device using the selected write buffer. In some implementations, processing logic can use the stored command information to identify the selected write buffer and initiate the write operation(s) to write the data directly to the memory devices. In other implementations, the processing logic can provide the stored command information to a media management component of the memory sub-system to write the data to the memory device. In either instance, processing logic can drain the data from the selected write buffer to a write data path block or available cache memory space within the memory sub-system prior to writing to the memory device. The processing logic can perform data integrity, data encryption, or other data validation operations on the data prior to writing to the memory device.

As noted above, by configuring multiple write buffers (e.g., multiple buffers to facilitate processing firmware write commands), multiple firmware media management write commands can be in flight (e.g., in process, active, etc.) at approximately the same time to improve local memory interface bandwidth utilization. Responsive to completing the DMA read operation to load the selected buffer, processing logic can invoke operation 450 to receive an additional write command from the command queue (or directly from the firmware component) while the active write operation is in process. At operation 450, the processing logic receives a second write command to write data from the local memory to the memory device(s), where the second write command is received before the write operation for the first write operation initiated by operation 440 has been completed.

Similar to the operations performed to process read commands described above, in various implementations, the firmware component can send a notification to the processing logic to indicate that another command is available to be processed. Alternatively, the processing logic can be monitoring the above mentioned FIFO queue to pop the next write command from the queue. In various implementations, processing logic can simultaneously process a number of write commands according to the number of enabled write buffers. For example, if two write buffers are configured and enabled, the processing logic can alternate between the two buffers, processing two write commands simultaneously. Similarly, if three write buffers are configured and enabled, the processing logic can process three write commands simultaneously, and so on.

At operation 460, the processing logic, responsive to receiving the second write command at operation 450, initiates a second write operation to write the data to the memory device(s). Processing logic can initiate the second write operation as described above with respect to operation 440. In various implementations, processing logic can repeat the above described operations to process any subsequently received write commands to retrieve additional data from the local memory and write it to the memory device(s) of the memory sub-system.

In some implementations, the write buffers in the memory sub-system can be configured to utilize a caching scheme to further improve efficiency. In such instances, where subsequently received write commands are directed to write the same data as a previously processed write command, the data loaded in a write buffer can be reused for the subsequent command without initiating an additional DMA operation to reload the buffer with data from the local memory location. When a write command is received and the command information is stored for the command as described above, additional information can be included to identify the data within the local memory (e.g., the address information, etc.). When a subsequent write command is received, the memory location of the data for the subsequently received command can be compared with any write commands currently in process. If the memory location of the data for the new write command matches the information for any of the commands in process, processing logic can bypass the DMA read operation to load an available buffer and perform the write operation for the new write command using the loaded buffer that is assigned to the applicable in-flight write command.

If the memory location of the data associated with the newly received write command does not match the stored information for any of the in-flight write commands, processing logic can determine whether there are any available write buffers to assign to the new command. In various implementations, processing logic can make this determination as described above with respect to operation 430. Responsive to determining that there is an available write buffer to receive the new data, processing logic can select the available buffer, store the command information for the new command that identifies the selected buffer, and perform the DMA read operation to load the selected buffer. Subsequently, processing logic can perform a write operation to write the newly loaded data to the memory device as described above. In instances where caching is not implemented, this process can be followed for any subsequently received write command.

As noted above with respect to FIG. 2, In some implementations, the buffers in the memory sub-system can be configured to handle both read and write commands. For example, during periods of increased write command activity, processing logic can temporarily provision buffers that are configured to service read commands. If processing logic determines that no additional write buffers are available, processing logic can identify the read buffers in a read data path associated with the memory device. The processing logic can determine whether any of the identified read buffers are available (e.g., not being utilized to service an executing read command), and if so temporarily provision the available read buffer to receive the data to service the pending write command. Upon completion of the write command, if read commands have been newly received, the provisioned read buffer can be returned to the pool of buffers to service read commands. If, however, no additional read commands have been received, the provisioned read buffer can be used for additional write commands.

As noted above, in some implementations, processing logic can configure multiple write buffers and enable a subset of those buffers for write traffic to maintain lower power consumption. During periods of increased observed write activity, processing logic can temporarily enable additional write buffers during those periods of increased activity. Subsequently, when the activity level decreases, the additional write buffers can be disabled to return power consumption to lower levels. In such instances, at operation 410, processing logic can determine a total number of write buffers that were configured for write commands, and enable a number of write buffers that is less than the total number. Subsequently, processing logic can monitor the level of read activity associated with received write commands. For example, the processing logic can monitor the number of write commands received over a period time, the amount of data processed for write commands over a period of time, or the like. Processing logic can determine whether the observed write activity satisfies a high activity threshold, and if so, enabling one or more of the configured (but not enabled) buffers to service additional write commands. Processing logic can continue monitoring the write activity, maintaining the additional buffers until the write activity drops to a lower activity threshold. Responsive to determining that the write activity has satisfied the lower threshold, processing logic can disable the additional write buffer(s).

Figure 5:
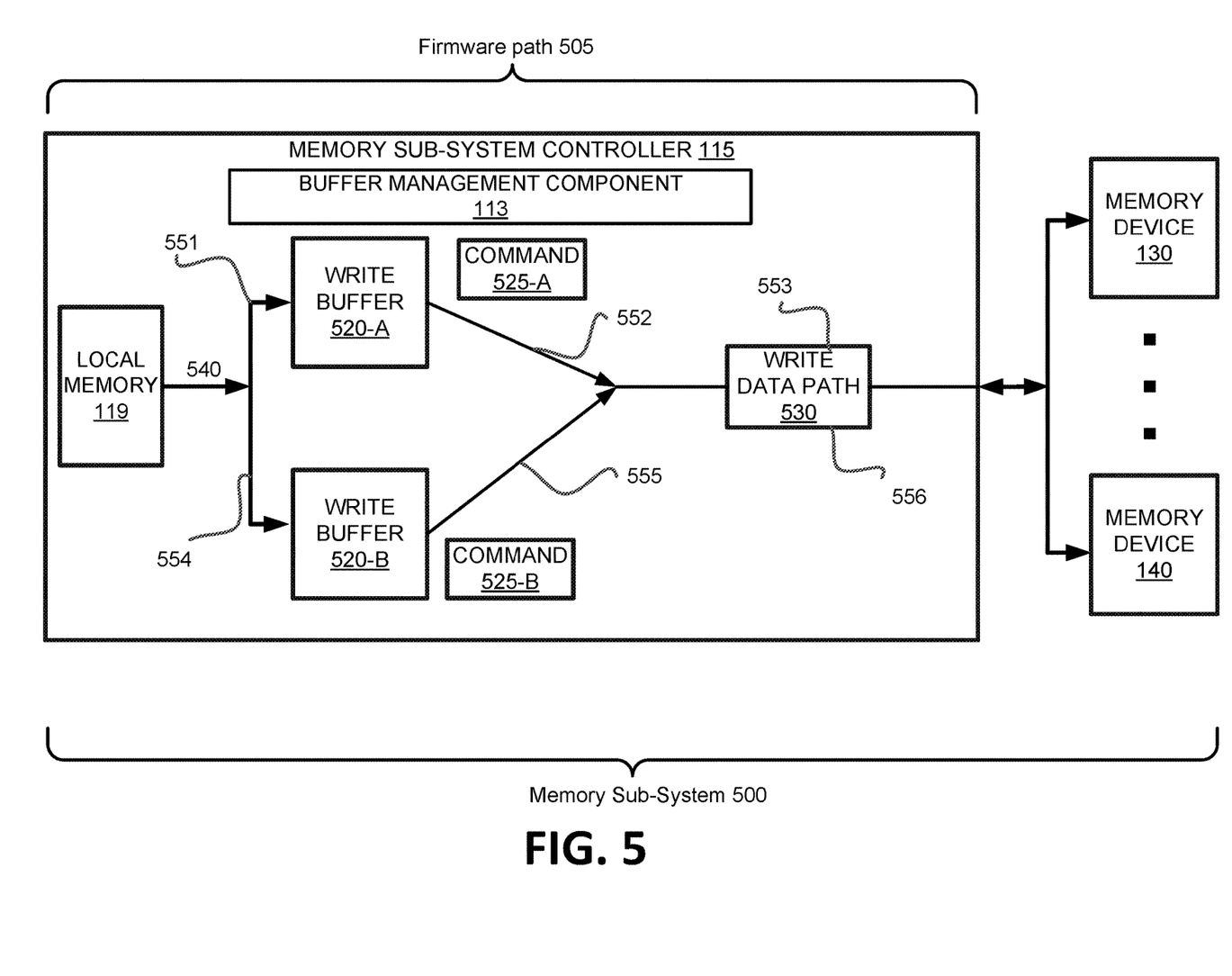
FIG. 5 illustrates a block diagram of a memory sub-system that includes a buffer management component to facilitate efficient buffer management for firmware media management write commands in a firmware path, in accordance with some embodiments of the present disclosure.

FIG. 5 illustrates a block diagram of a memory sub-system 500 that includes a buffer management component 113 (e.g., buffer management component 113 of memory sub-system 110 in FIG. 1) to facilitate efficient buffer management for firmware media management write commands in a firmware path 505, in accordance with some embodiments of the present disclosure.

As shown in FIG. 5, and as described above with respect to FIG. 4, buffer management component 113 can configure write buffers 520-A, 520-B for use in the firmware path 505 in performing media management write operations. Although for simplicity of illustration only two buffers are shown in FIG. 5, in various implementations, aspects of the present disclosure can be applied to memory sub-systems that can configure more than two buffers. As described above, buffers 520-A, 520-B can be coupled to local memory 119 via a bus 540 (e.g., an AXI bus) to facilitate efficient data transfer.

Buffer management component 113 can receive a write command (directly from a firmware component, from a command queue, etc.), and store information associated with that command in a memory space command 525-A. As shown, buffer management component 113 identifies write buffer 520-A as available and selects it for command 525-A. Once write buffer 520-A has been selected, buffer management component 113 initiates a write operation to write data from local memory 119 to memory devices 130, 140. As described above, buffer management component 113 can initiate DMA read operation 551 to move the data for command 525-A from local memory 119 into write buffer 520-A. Once the data has been loaded into write buffer 520-A, the stored command information can be provided to write data path 530 to facilitate the write operation to the memory devices 130, 140 (operation 552). Write data path 530 can perform data integrity checks, encryption operations, etc. on the data and subsequently perform write operation 553 to write the data to the memory devices 130, 140. Responsive to committing the data, write data path 530 can provide a response to buffer management component 113 to indicate that the associated write buffer 520-A can be made available for a subsequent command.

Similarly, buffer management component 113 can receive an additional write command to write data to memory devices 130, 140, and store information associated with that command in a memory space command 525-B. In some instances write command 525-B can be received immediately following write command 525-A. In other instances, write command 525-B can be received at a later time, but before write command 525-A has been completed. As shown, buffer management component 113 identifies write buffer 520-B as available and selects it for command 525-B. Once write buffer 520-A has been selected, buffer management component 113 initiates a write operation to write data from local memory 119 to memory devices 130, 140. As described above, buffer management component 113 can initiate DMA read operation 552 to move the data for command 525-B from local memory 119 into write buffer 520-B. Once the data has been moved into write buffer 520-B, the stored command information can be provided to write data path 530 to facilitate the write operation to the memory devices 130, 140 (operation 555). Write data path 530 can perform data integrity checks, encryption operations, etc. on the data and subsequently perform write operation 556 to write the data to the memory devices 130, 140. Responsive to committing the data, write data path 530 can provide a response to buffer management component 113 to indicate that the associated write buffer 520-B can be made available for a subsequent command.

Figure 6:
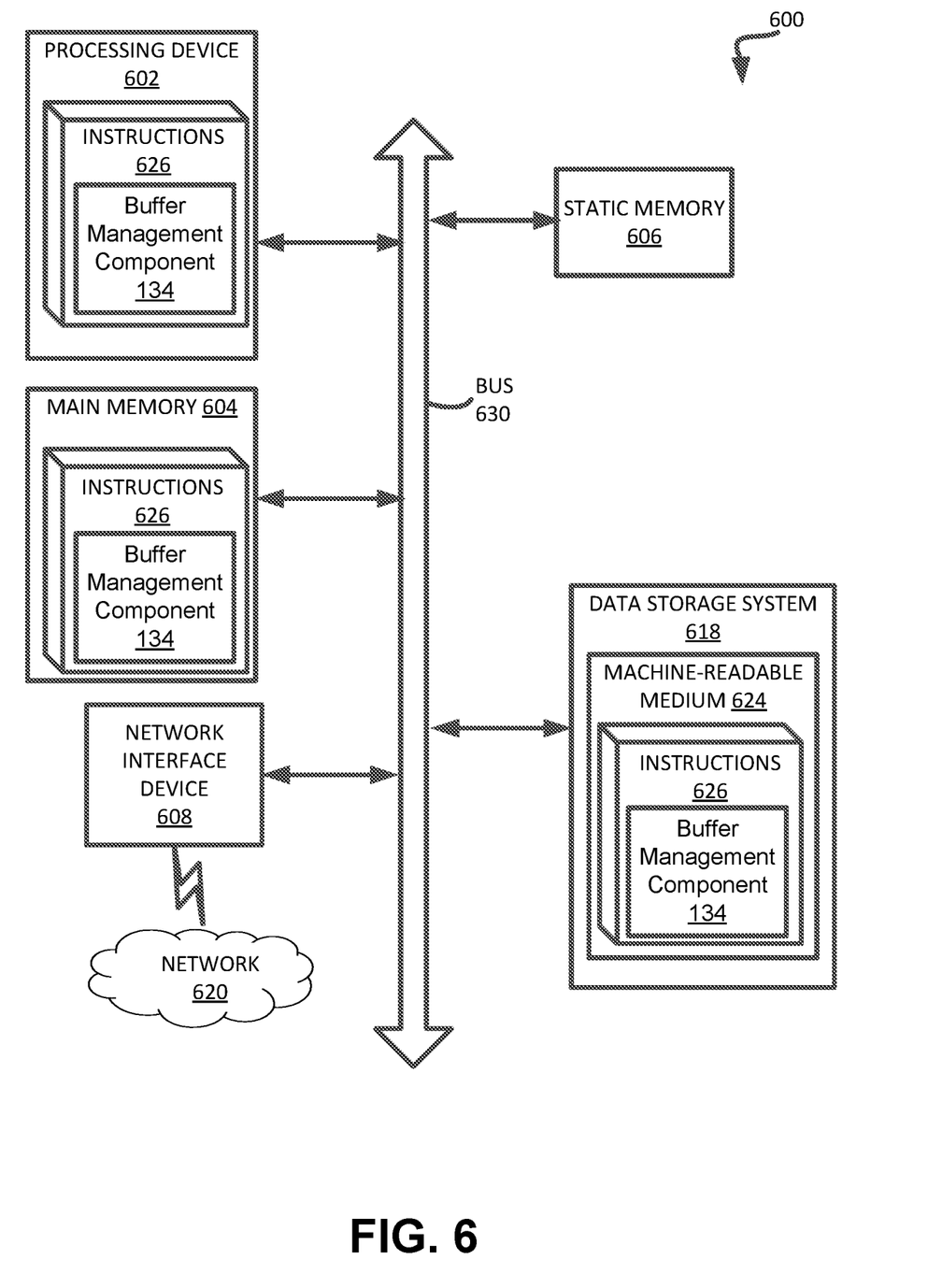
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the buffer management component 134 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a configuration setting manager (e.g., the buffer management component 134 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer.

Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    determining, by a processing device, a total number of read buffers in a plurality of read buffers;
    configuring a first number of read buffers of the plurality of read buffers in a data path associated with a memory device of a memory sub-system, wherein read buffers of the plurality of read buffers in the data path are configured to facilitate simultaneous processing of read commands, wherein the first number of read buffers is less than the total number of read buffers;
    receiving a first read command to read a first data stored at a first address of the memory device, wherein each available read buffer of the plurality of read buffers is enabled to receive the first data stored at the first address;
    selecting a first available read buffer of the plurality of read buffers to receive the first data for the first read command;
    responsive to selecting the first available read buffer, initiating, by the processing device, a first read operation to retrieve the first data from the first address of the memory device and store the first data in the first available read buffer;
    receiving a second read command to read a second data stored at a second address of the memory device, wherein the second read command is received before the first read command has been completed, wherein each available read buffer of the plurality of read buffers is enabled to receive the second data stored at the second address;
    responsive to determining that another read buffer of the plurality of read buffers is available to receive the second data, selecting a second available read buffer of the plurality of read buffers to receive the second data for the second read command, wherein the second available read buffer is different from the first available read buffer; and
    responsive to selecting the second available read buffer, initiating, by the processing device, a second read operation to retrieve the second data from the second address of the memory device and store the second data in the second available read buffer.

2. The method of claim 1, further comprising:
    storing, in a memory area, a first command information associated with the first read command, wherein the first command information comprises an identifier associated with the first available read buffer;
    retrieving the first data from the memory device;
    responsive to retrieving the first data, performing a data integrity operation on the first data;
    responsive to performing the data integrity operation, storing, in view of the stored first command information, the first data in the first available read buffer;
    responsive to storing the first data in the first available read buffer, performing a direct memory access (DMA) write operation to move the first data from the first available read buffer to a local memory location; and
    responsive to completing the DMA write operation:
        updating a command status for the first read command to indicate that the first read command has completed; and
        updating a buffer status for the first available read buffer to indicate that the first available read buffer is again available to receive additional data.

3. The method of claim 1, further comprising:
    responsive to determining that another read buffer of the plurality of read buffers is not available:
        identifying one or more write buffers in the data path associated with the memory device;
        determining whether a first write buffer of the one or more write buffers is available to receive the second data; and
        responsive to determining whether the first write buffer is available, provisioning the first write buffer to receive the second data for the second read command.

4. The method of claim 3, further comprising:
    responsive to determining that the second read command has completed:
        determining whether a write command has been received to write a third data to the memory device; and
        responsive to determining that the write command has been received, provisioning the first write buffer to receive the third data for the write command.

5. The method of claim 1, further comprising:
    monitoring a level of read activity associated with received read commands to read data from the memory device;
    determining whether the level of read activity satisfies a high activity threshold; and responsive to determining that the level of read activity satisfies the high activity threshold, enabling one or more additional read buffers from the plurality of read buffers.

6. The method of claim 5, further comprising:
determining whether the level of read activity satisfies a low activity threshold; and
responsive to determining that the level of read activity satisfies the low activity threshold, disabling the one or more additional read buffers from the plurality of read buffers.

7. A method comprising:
configuring, by a processing device, a plurality of write buffers in a data path associated with a memory device of a memory sub-system;
determining a total number of write buffers in the plurality of write buffers;
enabling one or more write buffers of the plurality of write buffers for receiving write commands based on a level of write activity associated with receiving commands to write data to the memory device, wherein a number of the one or more write buffers is less than the total number of write buffers;
receiving a first write command to write a first data from a first local memory location to a first address of the memory device, wherein each available write buffer of the plurality of write buffers is enabled to receive the first data to be written to the first address of the memory device;
selecting a first available write buffer of the plurality of write buffers to receive the first data for the first write command from the first local memory location;
responsive to selecting the first available write buffer, initiating a first write operation to write the first data to the first address of the memory device using the first available write buffer;
receiving a second write command to write a second data from a second local memory location to a second address of the memory device, wherein the second write command is received before the first write operation has completed, wherein each available write buffer of the plurality of write buffers is enabled to receive the second data to be written to the second address of the memory device; and
responsive to receiving the second write command, initiating a second write operation to write the second data to the second address of the memory device using the first available write buffer or a second available write buffer of the plurality of write buffers.

8. The method of claim 7, further comprising:
storing a first command information associated with the first write command, wherein the first command information comprises an identifier associated with the first available write buffer;
performing a direct memory access (DMA) read operation to move the first data from the first local memory location to the first available write buffer; and
responsive to completing the DMA read operation, performing, in view of the first command information, the first write operation to write the first data to the first address of the memory device using the first available write buffer.

9. The method of claim 8, wherein the first command information comprises the first local memory location, the method further comprising:

determining whether the second local memory location associated with the second write command matches the first local memory location associated with the first write command; and
responsive to determining that the second local memory location matches the first local memory location:
storing a second command information associated with the second write command, wherein the second command information comprises an identifier associated with the first available write buffer; and
performing, in view of the second command information, the second write operation to write the first data to the first address the memory device using the first available write buffer.

10. The method of claim 9, further comprising:
responsive to determining that the second local memory location does not match the first local memory location:
responsive to determining that another write buffer of the plurality of write buffers is available, selecting the second available write buffer of the plurality of write buffers to receive the second data for the second write command from the second local memory location, wherein the second available write buffer is different from the first available write buffer;
storing a second command information associated with the second write command, wherein the second command information comprises a second identifier associated with the second available write buffer;
performing a second DMA read operation to move the second data from the second local memory location to the second available write buffer; and
responsive to completing the second DMA read operation, performing, in view of the second command information, the second write operation to write the second data to the second address of the memory device using the second available write buffer.

11. The method of claim 10, further comprising:
responsive to determining that another write buffer of the plurality of write buffers is not available:
identifying one or more read buffers in the data path associated with the memory device;
determining whether a first read buffer of the one or more read buffers is available to receive the second data; and
responsive to determining that the first read buffer is available, provisioning the first read buffer to receive the second data for the second write command.

12. The method of claim 11, further comprising:
responsive to determining that the second write command has completed:
determining whether a read command has been received to read a third data from the memory device; and
responsive to determining that the read command has been received, provisioning the first read buffer to receive the third data for the read command.

13. The method of claim 7, further comprising:
monitoring the level of write activity;
determining whether the level of write activity satisfies a high activity threshold; and
responsive to determining that the level of write activity satisfies the high activity threshold, enabling one or more additional write buffers from the plurality of write buffers.

14. The method of claim 13, further comprising:
determining whether the level of write activity satisfies a low activity threshold; and
responsive to determining that the write of read activity satisfies the low activity threshold, disabling the one or more additional write buffers from the plurality of write buffers.

15. A system comprising:
a plurality of memory devices; and
a processing device, operatively coupled with the plurality of memory devices to perform operations comprising:
  configuring a plurality of read buffers in a data path associated with a memory device of a memory sub-system;
  determining a total number of read buffers in the plurality of read buffers;
  enabling one or more read buffers of the plurality of read buffers for receiving commands based on a level of read activity associated with receiving commands to read data from the memory device, wherein a number of the one or more read buffers is less than the total number of read buffers;
  receiving a first read command to read a first data stored at a first address of the memory device, wherein each available read buffer of the plurality of read buffers is enabled to receive the first data stored at the first address;
  selecting a first available read buffer of the plurality of read buffers to receive the first data for the first read command;
  responsive to selecting the first available read buffer, initiating, by the processing device, a first read operation to retrieve the first data from the first address of the memory device and store the first data in the first available read buffer;
  receiving a second read command to read a second data stored at a second address of the memory device, wherein the second read command is received before the first read command has been completed, wherein each available read buffer of the plurality of read buffers is enabled to receive the second data stored at the second address;
  responsive to determining that another read buffer of the plurality of read buffers is available to receive the second data, selecting a second available read buffer of the plurality of read buffers to receive the second data for the second read command, wherein the second available read buffer is different from the first available read buffer; and
  responsive to selecting the second available read buffer, initiating, by the processing device, a second read operation to retrieve the second data from the second address of the memory device and store the second data in the second available read buffer.

16. The system of claim 15, wherein the processing device is to perform further operations comprising:
  storing, in a memory area, a first command information associated with the first read command, wherein the first command information comprises an identifier associated with the first available read buffer;
  retrieving the first data from the memory device;
  responsive to retrieving the first data, performing a data integrity operation on the first data;
  responsive to performing the data integrity operation, storing, in view of the stored first command information, the first data in the first available read buffer;
  responsive to storing the first data in the first available read buffer, performing a direct memory access (DMA) write operation to move the first data from the first available read buffer to a local memory location; and
  responsive to completing the DMA write operation:
    updating a command status for the first read command to indicate that the first read command has completed; and
    updating a buffer status for the first available read buffer to indicate that the first available read buffer is again available to receive additional data.

17. The system of claim 15, wherein the processing device is to perform further operations comprising:
  responsive to determining that another read buffer of the plurality of read buffers is not available:
    identifying one or more write buffers in the data path associated with the memory device;
    determining whether a first write buffer of the one or more write buffers is available to receive the second data; and
    responsive to determining whether the first write buffer is available, provisioning the first write buffer to receive the second data for the second read command.

18. The system of claim 17, wherein the processing device is to perform further operations comprising:
  responsive to determining that the second read command has completed:
    determining whether a write command has been received to write a third data to the memory device; and
    responsive to determining that the write command has been received, provisioning the first write buffer to receive the third data for the write command.

* * * * *